US012454406B2

(12) United States Patent
Tombul et al.

(10) Patent No.: US 12,454,406 B2
(45) Date of Patent: Oct. 28, 2025

(54) MULTILAYER PANEL COMPRISING BIOFILM TO REDUCE EVAPORATION IN DAMS

(71) Applicants: ESKISEHIR TEKNIK UNIVERSITESI, Eskisehir (TR); ISTANBUL GELISIM UNIVERSITESI, Istanbul (TR); ANADOLU UNIVERSITESI, Eskisehir (TR)

(72) Inventors: Mustafa Tombul, Eskisehir (TR); Masoud Derakhshandeh, Eskisehir (TR); Ali Savas Koparal, Eskisehir (TR)

(73) Assignees: ESKISEHIR TEKNIK UNIVERSITESI (TR); ISTANBUL GELISIM UNIVERSITESI (TR); ANADOLU UNIVERSITESI (TR)

( * ) Notice: Subject to any disclaimer, the term of this patent is extended or adjusted under 35 U.S.C. 154(b) by 759 days.

(21) Appl. No.: 17/787,947

(22) PCT Filed: Dec. 18, 2020

(86) PCT No.: PCT/TR2020/051330
§ 371 (c)(1),
(2) Date: Jun. 22, 2022

(87) PCT Pub. No.: WO2021/133336
PCT Pub. Date: Jul. 1, 2021

(65) Prior Publication Data
US 2023/0032456 A1    Feb. 2, 2023

(30) Foreign Application Priority Data
Dec. 24, 2019  (TR) .................................. 2019/21209

(51) Int. Cl.
B65D 88/36    (2006.01)
A01G 33/00    (2006.01)
(Continued)

(52) U.S. Cl.
CPC ............. *B65D 88/36* (2013.01); *A01G 33/00* (2013.01); *B65D 90/022* (2013.01); *B65D 90/42* (2013.01)

(58) Field of Classification Search
CPC ...... B65D 88/36; B65D 90/022; B65D 90/42; A01G 33/00
See application file for complete search history.

(56) References Cited

U.S. PATENT DOCUMENTS 3,462,040 A * 8/1969 Galloway .............. B65D 88/34
220/218
4,270,232 A * 6/1981 Ballew .................. B65D 88/36
126/566

(Continued)

FOREIGN PATENT DOCUMENTS

| CN | 110343605 B | * | 7/2024 | ............. C02F 3/322 |
| WO | WO-2014072294 A1 | * | 5/2014 | ............. A01G 33/00 |
| WO | WO-2019122474 A1 | * | 6/2019 | ............. B65D 88/34 |

OTHER PUBLICATIONS

CN-110343605-B_English Translation (Year: 2019).*
WO2019122474A1_English translation (Year: 2019).*

*Primary Examiner* — Youngsul Jeong

(57) ABSTRACT

The invention relates to a biofilm based panel that is developed for reducing evaporation in dam reservoirs, and allows biomass production. The biofilm based panel of the invention comprises in general three main layers, a support layer (4), a nutrient layer (2) and a biofilm layer (1). Based on the climate in which the dams are located, a heat storage intermediate layer (3) may also be added. The support layer (Continued)

(4) is the top layer. The developed panel is positioned such that it partially covers the water surface.

12 Claims, 2 Drawing Sheets

(51) Int. Cl.
 *B65D 90/02* (2019.01)
 *B65D 90/42* (2006.01)

(56) References Cited

U.S. PATENT DOCUMENTS

| | | | |
|---|---|---|---|
| 8,029,208 B1 | 10/2011 | Lee et al. | |
| 2008/0000903 A1 | 1/2008 | Cap et al. | |
| 2018/0093824 A1* | 4/2018 | Plett | B65D 88/34 |

* cited by examiner

MULTILAYER PANEL COMPRISING BIOFILM TO REDUCE EVAPORATION IN DAMS

FIELD OF THE INVENTION

The invention relates to a biofilm based covering panel that is developed for inhibiting losses by evaporation in reservoirs, and allows biomass production.

PRIOR ART

Today, there is a decrease in water resources together with drought due to the global warming increasing day by day. This situation adversely affects dams which have an important role in terms of sustainable hydroelectric power generation and water supply. It is known that most of the water accumulated in dam reservoirs returns to the atmosphere by evaporation. Therefore, the efficiency of dams decreases significantly.

In order to inhibit evaporation of water from dam reservoirs, layers such as liquid chemical covering, continuous plastic covering or suspended covering are used on the water surface. When covering the water surface with a liquid chemical, the quality of the water deteriorates due to contact of the chemical with water. Said covering layers wear out over time due to external factors. In addition, since said coverings are consumable materials, they need to be renewed constantly and it increases the cost.

In the prior art, multilayer coverings have been developed to reduce evaporation in dam reservoirs.

An example of the prior art is the patent document with no. U.S. Pat. No. 8,029,208. The document concerns a cover structure developed for reducing evaporation in reservoirs and a method of applying thereof. The surface of the water is covered by placing the cover structures of the document in a certain order without leaving any gaps. Said cover structure consists of a circular upper layer with a brim providing overlap with other structures, a support structure connecting the upper and lower layers, and a circular lower layer with a brim providing overlap with other structures. The cover structure preferably comprises a plastic material.

Another example of the prior art is the patent document with no. US2008000903. The document relates to a modular cover structure developed for reducing and controlling evaporation. Each module in said cover structure includes in general an upper layer, a lower layer, a chamber between the upper layer and the lower layer, openings in the lower layer to allow ingress of water, openings in the upper layer to allow air inflow and floats. The upper and lower layers may be configured as hexagonal or octagonal shapes.

It is thought that the coverings of said documents inhibit the transfer of oxygen and carbon dioxide due to being contact with the water surface, and this restricts the life of microorganisms in the aquatic habitat. In addition, these coverings do not provide an improvement for biomass production.

In order to overcome the aforementioned drawbacks, a multilayer structure has been developed that does not harm the aquatic habitat in the dam reservoirs and allows the production of biomass and thus biofuel and valuable biochemicals.

DETAILED DESCRIPTION OF THE INVENTION

The invention relates to a biofilm based multilayer structure for inhibiting evaporation in water chambers (5) such as dam lake. In embodiments of the invention described below, this structure is in a panel form.

The invention belongs to the art of hydrology, hydraulic works, energy and biotechnology.

The covering of the invention offers an environmentally friendly solution to reduce evaporation in dam reservoirs.

The invention is a multilayer panel that floats on the water to cover a part of the water surface, and it is based on reducing evaporation in dam chambers without restricting the life of microorganisms in the aquatic habitat, and utilizing biomass by cultivating a biofilm layer (1) on the (reverse) surface facing the water.

The invention is a multilayer panel for dams that reduces evaporation, wherein it comprises in general
- a biofilm layer (1) comprising microorganism, grown/cultivated on the surface of the panel facing the liquid,
- a nutrient laver (2) comprising nutrients for said microorganism, placed on the biofilm layer (1) such that it is positioned adjacent to the biofilm layer (1),
- a support layer (4) placed on the nutrient layer (2) and
- at least one floating support (6) carrying said layers in connection with the support layer (4), preventing these layers from contacting with the liquid and enabling the panel to float on the liquid by contacting the surface of the liquid.

One embodiment of the invention comprises a heat storage intermediate layer (3). It is preferably between the support layer (4) and the nutrient layer (2). Said layer comprises Phase Change Material (PCM). This material could be L1NO3.2H2O or any PCM material with similar properties at the suitable range of application for the invention goals.

In one embodiment of the invention, the microorganisms are microalgae.

In one embodiment of the invention, there are four floating supports (6).

An embodiment of the invention comprises at least one reflector at its edge for reflecting light on the surface facing the liquid. Thus, more efficient cultivation of microalgae is provided.

In one embodiment of the invention, the nutrients comprise nitrogen (N), phosphor (P), sulfur (S).

In one embodiment of the invention, the nutrients are in solid form.

An embodiment of the invention given in FIG. 1 shows two panels floating on a lake. Side and top views of these panels are given. Said panel comprises three main layers, a support layer (4), a nutrient laver (2) and a biofilm layer (1). Based on the climate in which the dams are located, a heat storage intermediate layer (3) may also be added. The support layer (4) is the top layer.

An embodiment of the invention comprises four main layers; a support layer (4), a heat storage intermediate layer (3), a nutrient layer (2) and a biofilm layer (1). This embodiment is shown in FIG. 2.

An embodiment of the invention partially covers the surface of the water. It is necessary to partially cover the surface. This is because the life of photosynthetic microorganisms in the aquatic habitat should not be restricted. Said microorganisms provide oxygen dissolved in water. As shown in FIG. 1, solar energy entering the water is reduced by the invention covering a part of the water surface. Also, the air flow on the water surface is reduced and the mass transfer rate (transportation of water molecules from the reservoir to the atmosphere) is reduced.

In one embodiment of the invention, reflectors are used at the edges of the panels to reflect light on the reverse surface for more efficient cultivation of microalgae on the reverse surface.

The heat storage intermediate layer (3) in one embodiment of the invention allows to store a large amount of energy by using latent heat capacity of the materials. The latent heat is the amount of heat released when the materials go through a phase transition at a constant temperature. For example, water goes through a phase transition at zero and one hundred degrees and stores or releases a large amount of heat depending on the phase transition direction. Considering the difference between daytime and night temperature, the lower temperature at night may be used to condense more water vapor during the daytime. A PCM material such as $LiNO_3.2H_2q$ as a salt hydrate, is applied as a heat storage intermediate layer (3). This material melts at 30° C. For example, let's assume that the temperature drops to 20° C. at night and the temperature rises to 35° C. during the daytime. The PCM layer loses heat overnight and solidifies. On the contrary, the PCM layer is colder than the environment (i.e., the steam rising from the water surface) and thus the heat will be transferred from the steam to the PCM layer and the steam will condense and liquefy. This phenomenon further reduces evaporation.

In one embodiment of the invention, nutritional chemicals are present in the matrix of the nutrient layer (2). These nutrients are necessary for microalgae. They may be for example nitrogen (N), phosphor (P), sulfur (S), etc. In the microalgae biofilm reactor setup known in the art, the base surface is adhered to the biofilm layer (1), and the nutrients are supplied by partially dipping the solution into the solution or spraying on it. However, the nutrients in the invention developed are in solid form.

In one embodiment of the invention, the biofilm layer (1) cultivates on the nutrient layer (2). Microalgae types are used as microorganisms. Types of microalgae are photosynthetic bacteria and cultivates by consuming carbon dioxide in the air. In this way, they also reduce the amount of carbon dioxide.

One embodiment of the invention comprises an area suitable for biomass seeding. This creates a high potential for biofuel production. Microalgae biotechnology is used for the biomass production, and there is a biofilm layer (1) that may be cultivated on surface of the covering facing the water.

In one embodiment of the invention, the biofilm layer (1) is placed such that it does not have a contact with the water body. Thus, there is no possibility of any contamination on the water surface. In addition to significantly reducing evaporation, the production of biomass may also be converted into useful products. Thus, a renewable energy source is provided.

In one embodiment of the invention, the biofilm farm in the invention does not completely cover the reservoir surface. In this way, it does not disrupt the life cycle of aquatic organisms.

In one embodiment of the invention, there is no contact between the biofilm and the water body. Therefore, there is no chemical contamination.

In one embodiment of the invention, the biofilm layer (1) is in a (facing down) position turned towards the surface. There is no chemical transport to water by rainfalls.

Thanks to the invention, the efficiency is increased by reducing evaporation in dams. In addition, biomass is produced and a renewable energy source is provided by utilizing the produced biomass.

Thanks to the invention, the free water surface is utilized as a photobioreactor for producing a large amount of biomass.

In the art, the microalgae biotechnology has been criticized for occupying arable land. Thanks to the invention, a new field for microalgae biotechnology is proposed.

The biomass produced by the invention is transformed into biofuels and other economically valuable biochemical products. The microalgae biomass is also considered as a food and a rich source of protein. The microalgae biomass contains about 45% oil that can be converted into biodiesel. The potential of liquid biofuel production provides an advantage of energy storage. This energy storage property cannot be provided by solar energy. Maximum growth and harvesting capacity in a short time is an advantage of microalgae biofilm.

Although artificial lakes known in the art are useful, they disrupt the normal climate of the surrounding regions and significantly increase the amount of humidity in the atmosphere. As a result, the agricultural order and climate of the region may change. With the invention, it is provided to reduce the humidity that causes serious climate change near dams.

In the invention, microalgae are cultivated on a wet surface with a certain distance from the water surface, not in a liquid environment. Thus, microalgae harvesting costs are greatly reduced. Harvesting in the microalgae technology, in other words the process of separating microalgae cells or biomass from the cultivating medium, is an expensive process. However, the low biomass concentration (approximately 1 g/l) and high water requirement of known available suspension culture systems lead to inefficient harvesting and high liquid transportation costs. Harvesting in these systems requires filtration, thickening and centrifugation, which accounts for approximately 20-30% of the total cost. For the purposes of the invention, the biomass can be taken from the solid bed by a mechanical harvesting system for harvesting. Microalgae biofilms have much higher biomass concentrations than suspension cultures and are easy to separate from the growing medium.

In one embodiment of the invention, the percentage of dry biomass in the microalgae paste obtained is between 15% and 25%.

Thanks to the invention, solutions are provided for two different problems. In addition to reducing evaporation, the biomass obtained can be utilized in different uses. The produced microalgae biomass can be transformed into biodiesel, bioalcohol, protein source and many different useful substances.

Thanks to the invention, carbon dioxide absorption is provided by biomass production and the effect of global warming is alleviated.

DESCRIPTION OF THE REFERENCE NUMBERS IN THE FIGURES

Figure 1:
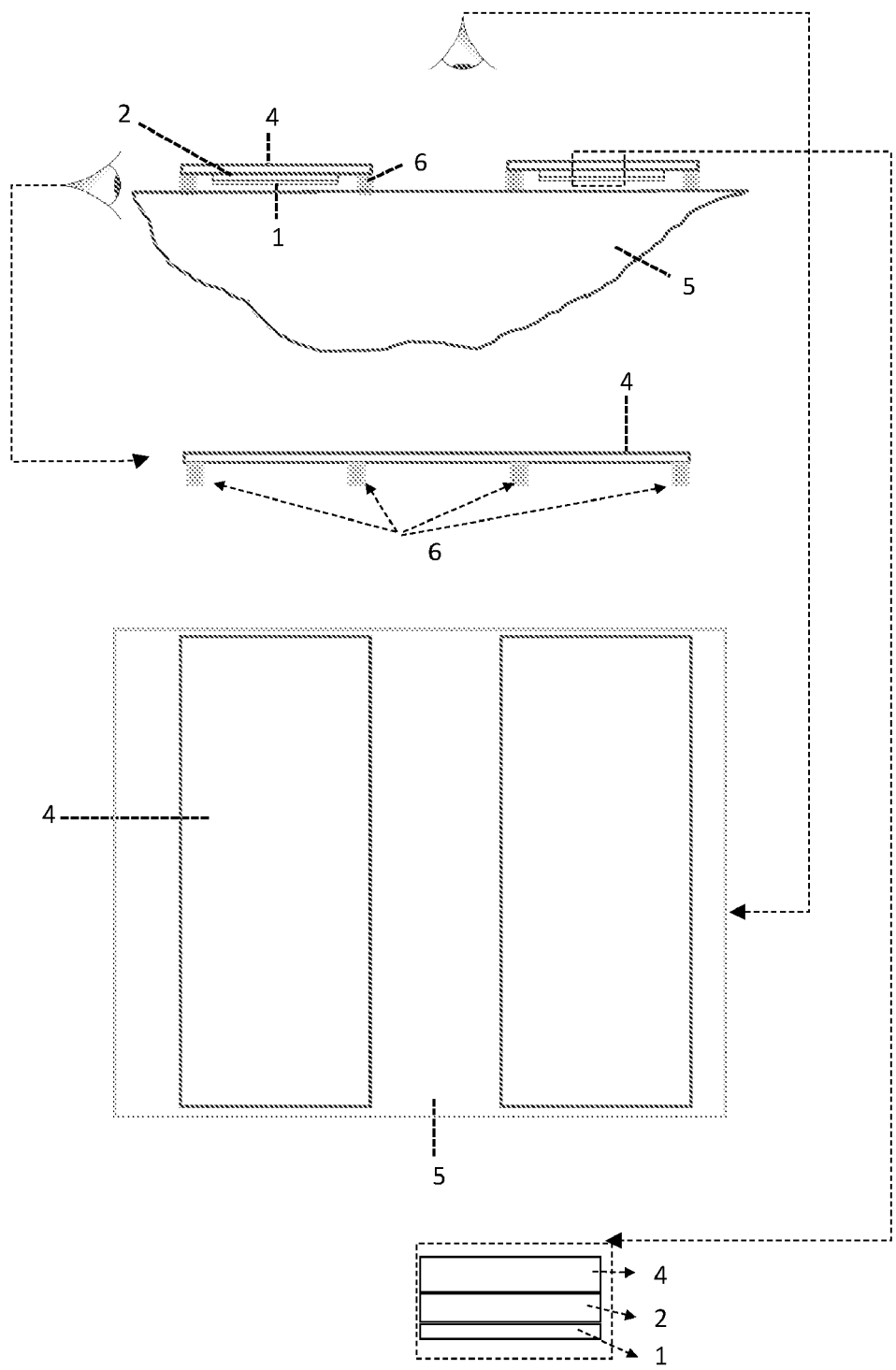
FIG. 1 A detailed view of an embodiment of the invention
Figure 2:
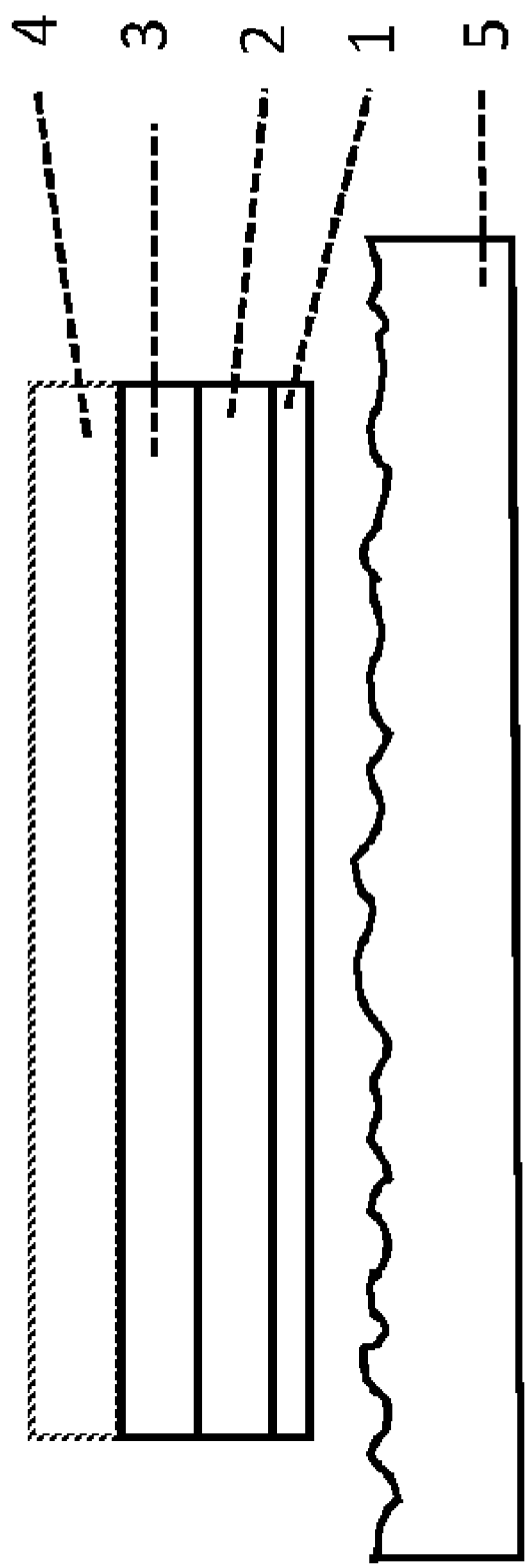
FIG. 2 A side cross-sectional view of an embodiment of the invention

1. Biofilm layer
2. Nutrient layer
3. Heat storage intermediate layer
4. Support layer
5. Water chamber
6. Floating support

What is claimed is:

1. A multilayer panel for dams covering a part of a surface of liquid for reducing evaporation, wherein the multilayer panel comprises:
   a biofilm layer (1) comprising microorganism, cultivated on a surface of the multilayer panel facing the liquid;
   a nutrient layer (2) comprising nutrients for said microorganism, placed on the biofilm layer (1) such that it is positioned adjacent to the biofilm layer (1);
   a support layer (4) placed on the nutrient layer (2); and
   at least one floating support (6) carrying said layers in connection with the support layer (4), preventing these layers from contacting with the liquid and enabling the multilayer panel to float on the liquid by contacting the surface of the liquid.

2. The multilayer panel of claim 1, wherein the multilayer panel comprises a heat storage intermediate layer (3).

3. The multilayer panel of claim 2, wherein the heat storage intermediate layer (3) is between the support layer (4) and the nutrient layer (2).

4. The multilayer panel of claim 3, wherein the heat storage intermediate layer (3) comprises a phase change material (PCM) material.

5. The multilayer panel of claim 4, wherein the PCM material is lithium nitrate dihydrate $LiNO_3 \cdot 2H_2O$.

6. The multilayer panel of claim 1, wherein the microorganism is microalgae.

7. The multilayer panel of claim 6, wherein a weight percentage of dry biomass in the microalgae is between 15% and 25%.

8. The multilayer panel of claim 1, wherein the multilayer panel comprises four floating supports (6).

9. The multilayer panel of claim 1, wherein the multilayer panel further comprises at least one reflector at its edge for reflecting light on the surface of the multilayer panel facing the liquid.

10. The multilayer panel of claim 1, wherein the nutrients comprise Nitrogen (N), Phosphorous (P) and Sulphur(S).

11. The multilayer panel of claim 1, wherein the nutrients are in a solid form.

12. The multilayer panel of claim 1, wherein the support layer (4) is a top layer of the multilayer panel.

* * * * *